Patented June 23, 1925.

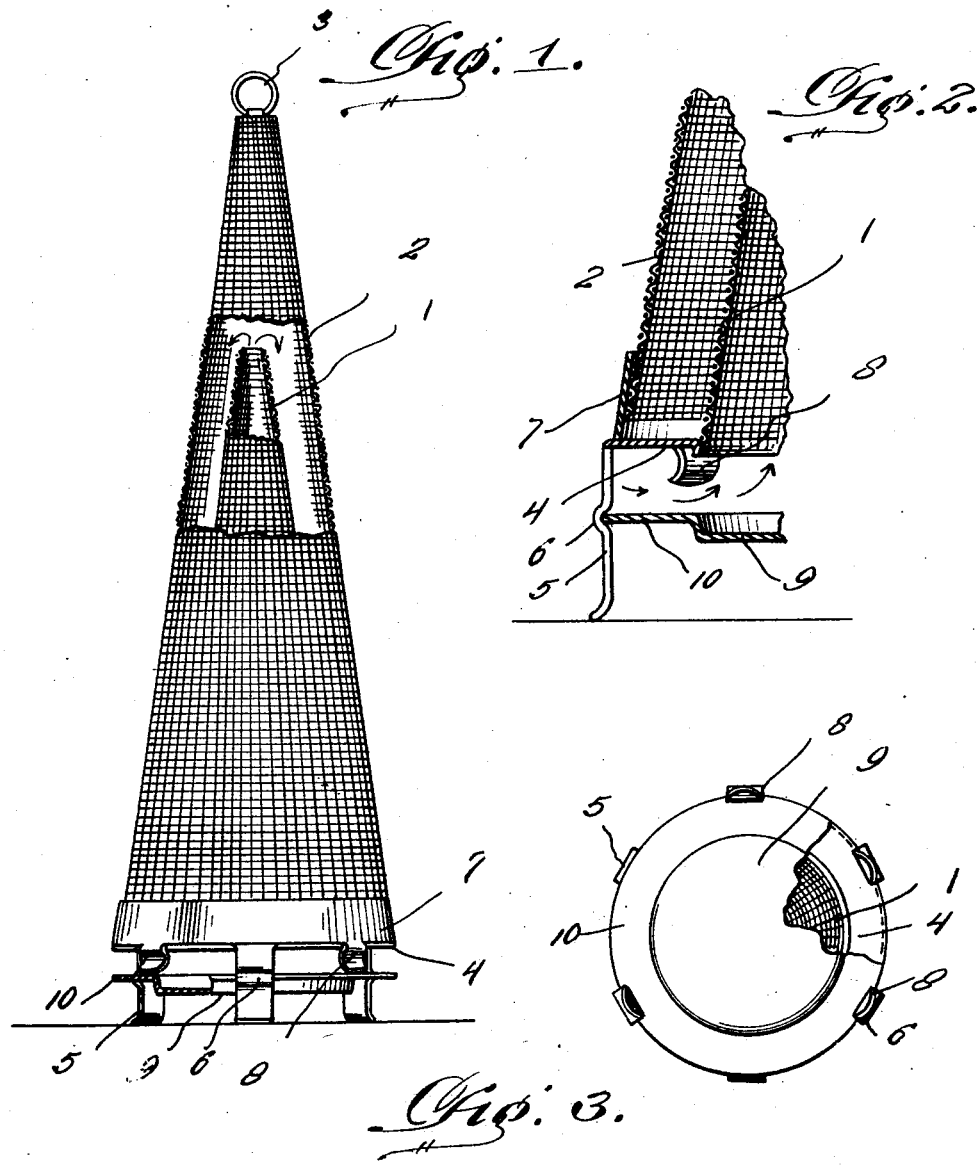

1,543,228

UNITED STATES PATENT OFFICE.

THOMAS A. MORROW, OF WILBURTON, OKLAHOMA.

FLYTRAP.

Application filed October 20, 1924. Serial No. 744,805.

*To all whom it may concern:*

Be it known that I, THOMAS A. MORROW, a citizen of the United States, residing at Wilburton, in the county of Latimer and State of Oklahoma, have invented certain new and useful Improvements in a Flytrap, of which the following is a specification.

This invention relates to an improved insect trap which has been especially designed for catching flies, although it is not to be restricted to this particular use.

The invention relates more specifically to a trap of this kind which embodies inner and outer spaced wire mesh cones, the inner one of which constitutes a trapping means, and the outer one of which forms a confining chamber between the two cones.

An important feature of the invention is to detachably mount the outer cone so that the entrapped flies may be removed whenever desired.

It is also a feature of the invention to provide a novel leg supported base with which the inner cone is connected, the inner cone rising therefrom and being surrounded by the outer cone, and the latter being provided with spring clips to engage this base and maintain the outer cone in place.

An advantage is derived from the use of a bait pan and the degree of novelty is increased by mounting this pan upon the legs which serve to support the aforesaid base.

Other features and advantages of the invention will become apparent from the following description and drawing.

In the accompanying drawing forming a part of this application and in which like numerals are employed to designate like parts throughout the same:

Figure 1 is a view partly in elevation, and partly in section, of an insect trap constructed in accordance with the present invention.

Figure 2 is an enlarged detail sectional view of the lower portion of the trap showing the details of construction more clearly.

Figure 3 is a bottom plan view, with a portion of the pan broken away.

Referring to the drawings in detail, it will be seen that the inner cone is designated by the reference character 1, this being the smaller cone and being open at its top to trap the flies in a well known way. The outer cone is denoted by the reference character 2, and this is of course, closed at its top so as to provide a confining compartment between the two cones. If desired, the outer cone may be provided with a finger ring 3 at its top to facilitate handling.

As before intimated and shown in Figure 2 more clearly, the inner cone 2 is connected at its bottom to an annular base ring 4, and this ring is supported in spaced relation above a table or other support by a plurality of depending legs 5. It is preferable to have the legs and base ring integral with each other. It is to be observed that the legs are provided with bends 6 between their ends and these constitute seats and serve in a manner to be hereinafter described. The outer cone 2 is provided at its bottom with a reinforcing ring 7 which is constructed with a plurality of clips 8. These clips are adapted to engage the marginal or outer peripheral edge of the base ring 4 to detachably connect the outer cone thereto. To facilitate this, the free ends of the clips are flared outwardly. They are of course of resilient metal so that they may be readily attached and detached.

In order to entice insects into the trap, I provide a bait pan 9 in which an appropriate compound may be placed. This pan is provided with a marginal flange 10 and in practice the edge of the flange is received in the seats formed by the aforesaid bends 6. Here, it may be conveniently pointed out that the free lower ends of the legs 5 are bent to flare outwardly as seen to facilitate proper supporting of the device and engagement of the pan with said bends.

In practice, the trap is set upon a table or the like and a liquid is placed in the pan to entice the flies into the trap. As indicated in Figure 2 by the arrows the flies are supposed to enter the trap above the pan, going upwardly into the inner cone 1 and through the open top thereof into the confining space existing between the two cones. After passing through the restricted open top of the cone 1, the flies cannot return and they are thus trapped, being removed from time to time by disengaging the clips 8 from the base ring 4 and removing the outer cone 2.

Having thus described the invention, what I claim is:—

A fly trap of the class described comprising an annular base ring having legs depending from its marginal edge, the free ends of said legs being flared outwardly and the intermediate portions of the legs being bent to provide inwardly opening seats, a bait pan having a marginal flange, the peripheral edge of which is removably received in said seats, an inner wire mesh cone connected at its bottom to the base ring, said cone being provided at its top with a restricted opening, and an outer cone surrounding the inner cone in spaced relation, said outer cone being provided at its bottom with a ring and said ring being provided with circumferentially spaced clips to take over the aforesaid base ring.

In testimony whereof I affix my signature.

THOMAS A. MORROW.